United States Patent Office 3,159,675
Patented Dec. 1, 1964

3,159,675
NOVEL 4-DEDIMETHYLAMINO-4-OXO - 6 - DE-METHYLTETRACYCLINE - 4 - OXIMES AND 4-HYDRAZONES
Robert Carlyle Esse, Pearl River, N.Y., and George Madison Sieger, Park Ridge, N.J., assignors to American Cyanamid Company, Stamford, Conn., a corporation of Maine
No Drawing. Filed Dec. 10, 1963, Ser. No. 329,369
14 Claims. (Cl. 260—559)

This invention relates to new organic compounds and, more particularly, is concerned with novel 4-dedimethylamino-4-oxo-6-demethyltetracycline-4-oximes and - 4-hydrazones and with methods of preparing these novel compounds. The novel 4-dedimethylamino-4-oxo-6-demethyltetracycline-4-oximes and -4-hydrazones of the present invention may be represented by the following general formula:

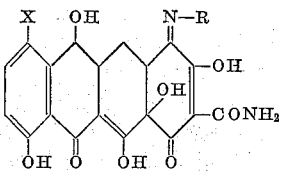

wherein R is hydroxy or amino and X is hydrogen or halogen. Halogen is exemplified by chlorine, bromine and iodine. The novel compounds of the present invention are well defined crystalline materials having characteristic ultraviolet absorption spectra. They may be conveniently purified either by crystallization from a suitable solvent or by partition-column chromatography The novel compounds of the present invention may be readily prepared from the appropriately substituted 4-hydroxytetracycloxides of the following general formula:

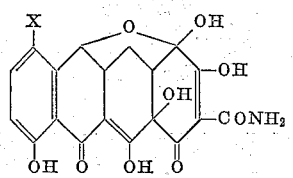

wherein X is hydrogen or halogen. For example, an appropriately substituted 4-hydroxytetracycloxide may be treated with hydroxyamine or hydrazine under alkaline conditions in a solvent such as water or lower alkanols or mixtures thereof. The hydroxylamine and hydrazine are preferably employed in the form of their hydrochloride salts with sufficient alkali to neutralize the hydrochloric acid and provide the requisite alkaline conditions.

The 4 - dedimethylamino-4-oxo-6-demethyltetracycline-4-oximes of the present invention may be isolated as the alkali metal salts thereof, such as the sodium salt or the potassium salt, or as the free oxime. The 4-dedimethylamino-4-oxo-6-demthyltetracycline-4-hydrazones of the present invention form acid-addition salts with a variety of organic and inorganic salt-forming reagents. Thus, acid-addition salts, formed by admixture of the organic free base with an acid, suitably in a neutral solvent, are formed with such acids as sulfuric, phosphoric, hydrochloric, hydrobromic, sulfamic, citric, lactic, tartaric, acetic, benzoic and related acids. For purposes of this invention the free oximes and hydrozones are equivalent to their salts.

The novel compounds of the present invention are useful in the synthesis of the heretofore difficultly obtainable 4 - dedimethylamino-4-di(lower alkyl)amino-6-demethyltetracyclines. For example, the oximes or hydrazones of the present invention may be treated with in excess of two stoichiometric equivalents of a lower alkanal under suitable reductive conditions whereby the corresponding symmetrical 4-dedimethylamino-4-di(lower alkyl)amino-6-demethyltetracycline is obtained. This reductive alkylation process may be accomplished by catalytic reduction using procedures well known to those in the art. Catalytic reduction may be accomplished in a solvent for the starting compound in the presence of a lower alkanal, a metal catalyst and hydrogen gas at pressures from atmospheric to super-atmospheric. Ordinarily, the reductive alkylation is conveniently carried out at hydrogen pressures of from about 1 to about 4 atmospheres. Although somewhat elevated temperatures facilitate the catalytic hydrogenation, temperatures of from 0° C. to 50° C., and usually room temperature, are preferred since they generally give best results. The metal catalyst may be of the base metal type, such as nickel or copper chromite, or it may be of the noble metal type, such as finely divided platinum, palladium or rhodium. The noble metal catalysts are advantageously employed on a carrier such as finely divided alumina, activated charcoal, diatomaceous earth, etc., in which form they are commonly available. The hydrogenation is carried out until the desired amount of hydrogen gas is absorbed at which point the hydrogenation is stopped. The solvents selected for the catalytic reduction should be reaction-inert, that is, they should not be capable of reacting with the starting materials, product, or hydrogen under the conditions of the reaction. A variety of solvents may be used for this purpose and minimum laboratory experimentation will permit the selection of a suitable solvent for any specific starting compound. Generally, the catalytic reductive alkylation may be carried out in solvents such as water; lower alkanols, e.g. methanol, ethanol; lower alkoxy lower alkanols, e.g. 2-methoxyethanol, 2-ethoxyethanol; tetrahydrofuran; dioxane; dimethylformamide; etc.

The unsymmetrical 4-dedimethylamino-4-(lower alkyl)(lower alkyl)amino-6-demethyltetracyclines may be prepared from the novel oximes of the present invention by first preparing the corresponding 4-alkylnitrones. The 4-alkylnitrones are alkylated oximes where N-alkylation rather than O-alkylation has occurred and correspond to the following general formula:

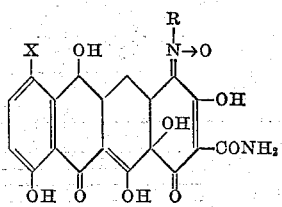

wherein R is lower alkyl and X is hydrogen or halogen. The 4-alkylnitrones are also new compounds and are included within the purview of the present invention.

The 4-alkylnitrones may be readily prepared by treating the novel 4-oximes of the present invention with an alkylating agent such as dimethyl sulfate, diethyl sulfate, methyl iodide, ethyl bromide, n-propyl chloride, etc., in a solvent such as water or a lower alkanol or mixtures thereof under conditions well known to those in the art. The 4-alkylnitrone is readily isolated by standard procedures. The 4-alkylnitrone, in turn, may be treated with a lower alkanal, under suitable reductive conditions as set forth above, whereby the corresponding unsymmetrical 4-dedimethylamino-4-(lower alkyl)(lower alkyl)amino-6-demethyltetracycline is obtained. This procedure may be used to prepare 6-demethyltetracyclines having a radioactive carbon in the 4-substituted-amino group, for tracer studies, by employing an alkylating agent which is $C^{14}$ radio labeled.

The 4-hydroxytetracycloxides of the following general formula:

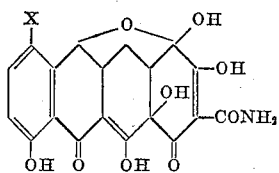

wherein X is hydrogen or halogen, the starting materials for the novel compounds of the present invention, may be readily prepared in good yield by treating 6-demethyltetracycline or a 7-halo-6-demethyltetracycline with sodium chlorate in the presence of hydrochloric acid or with an N-halosuccinimide. The reaction is conveniently carried out in a suitable solvent such as, for example, glacial acetic acid, methanol, dimethylformamide, and the like, at temperatures ranging from −10° C. to 35° C. over a period of time of from as little as a few minutes to an hour or more. After the reaction is complete, the product may be obtained by standard procedures. For example, it is most convenient to merely dilute the reaction mixture with a non-solvent, e.g. water, which results in precipitation of the product. The crude product may then be purified by recrystallization from a methylcellosolve-0.1 N hydrochloric acid mixture.

The 4-dedimethylamino-4-di(lower alkyl)amino-6-demethyltetracyclines and 4-dedimethylamino-4-(lower alkyl)(lower alkyl)amino-6-demethyltetracyclines are biologically active and possess activity against both gram-positive and gram-negative microorganisms. For example, the antibacterial spectrum of 4-dedimethylamino-4-methylethylamino-6-demethyltetracycline was determined in a standard manner by the agar dilution streak technique. The antibacterial spectrum of a compound represents the amount required to inhibit the growth of various typical bacteria and is commonly used in testing new antibiotics. The minimal inhibitory concentrations expressed in gammas per milliliter of 4-dedimethylamino-4-methylethylamino-6-demethyltetracycline against various test organisms is shown in Table I below. For comparison purposes, the antibacterial spectrum of 6-demethyltetracycline hydrochloride against the same organisms is also included.

TABLE I (1) 4-dedimethylamino-4-methylethylamino-6-demethyltetracycline
(2) 6-demethyltetracycline hydrochloride

| Organism | (1) | (2) |
| --- | --- | --- |
| Mycobacterium ranae | 1 | 2 |
| Mycobacterium smegmatis ATCC 607 | 2 | 4 |
| Staphylococcus aureus 209 P | 4 | 4 |
| Bacillus subtilis ATCC 6933 | 1 | 1 |
| Streptococcus pyogenes C 203 | 2 | 2 |
| Streptococcus γ No. 11 | 125 | 125 |
| Staphylococcus albus No. 69 | 125 | 250 |
| Streptococcus β No. 80 | 125 | >250 |
| Bacillus cereus No. 5 | 1 | 1 |
| Pseudomonas aeruginosa | 62 | 31 |
| Escherichia coli ATCC 9637 | 8 | 15 |
| Salmonella gallinarum | 8 | 15 |
| Streptococcus faecalis ATCC 8043 | 4 | 4 |
| Klebsiella pneumoniae ATCC 10031 | 4 | 4 |
| Proteus vulgaris ATCC 9484 | 8 | 15 |

The 4-dedimethylamino-4-di(lower alkyl)amino-6-demethyltetracyclines and 4-dedimethylamino-4-(lower alkyl)-(lower alkyl)amino-6-demthyltetracyclines also possess unusual activity against gram negative microorganisms such as *Escherichia coli* and *Salmonella typhosa*. It has been determined that when administered in a single oral tubing dose of 16 mg./kg. of body weight against *Escherichia coli* infections in mice; 4-dedimethylamino-4-methylpropylamino-6-demethyltetracycline is twice as effective as tetracycline, 4-dedimethylamino-4-diethylamino-6-demethyltetracycline is three times as effective as tetracycline, and 4-dedimethylamino-4-methylethylamino-6-demethyltetracycline is twice as effective as 6-demethyltetracycline.

The invention will be described in greater detail in conjunction with the following specific examples.

*Example 1*

4-HYDROXYTETRACYCLOXIDE

In a solution of 800 ml. of methanol and 170 ml. of conc. hydrochloric acid was dissolved 86 g. of 6-demethyltetracycline. Then a solution of 8.6 g. of sodium chlorate in 40 ml. of water was added over a ten minute period. At the beginning of the addition, the temperature of the reaction mixture was 19.5° C., whereas at the end of the addition the temperature had risen to 25.5° C. Five minutes after the addition was complete the temperature of the reaction mixture had risen to 32° C. whereupon a heavy precipitate began forming. The reaction mixture was then stirred at room temperature for 10 minutes and then at ice bath temperature for one hour. The reaction mixture was then diluted with 200 ml. of water, the precipitate was removed by filtration and washed several times with water. The yield of vacuum-oven dried product was 50 g. The 4-hydroxytetracycloxide was recrystallized as follows: 1 g. was dissolved in 20 ml. of methylcellosolve and stirred with 200 mg. of Darco for 20 minutes, the Darco was removed by filtration, and the white crystalline product was precipitated by the addition of 4 volumes of 0.1 N hydrochloric acid.

*Example 2*

4-HYDROXYTETRACYCLOXIDE

In 30 ml. of glacial acetic acid was dissolved 4.3 g. of 6-demethyltetracycline and to this solution was added 1.5 g. of N-chlorosuccinimide over a period of 5 minutes. The resulting solution was stirred at room temperature for 30 minutes and then poured into 300 ml. of water. The precipitate which formed was removed by filtration and vacuum-oven dried. Recrystallization of the 4-hydroxytetracycloxide was effected in the same manner as in Example 1.

*Example 3*

4-HYDROXYTETRACYCLOXIDE

In 280 ml. of dimethylformamide was dissolved 10 g. of 6-demethyltetracycline and the resulting solution was exposed to air at room temperature for 10 days. Isolation was by evaporation of the solvent under reduced pressure followed by slurrying the dried residue in 250 ml. of 0.1 N hydrochloric acid, and collecting the insoluble material by filtration. This crude product, 4-hydroxytetracycloxide, was purified by recrystallization as in Example 1.

*Example 4*

7-CHLORO-4-HYDROXYTETRACYCLOXIDE 6-demethyl-7-chlorotetracycline (46.5 g.) was dissolved in glacial acetic acid (300 ml.). Concentrated HCl (85 ml.) was added to this solution and the resulting solution was then cooled to just above freezing with an ice bath. To the cooled, stirred solution there was added dropwise, over a ten minute period, a solution of sodium chlorate (4.3 g.) in 20 ml. water. At the end of the addition period, the ice bath was removed and the reaction mixture was stirred an additional ten minutes and then poured into 3 liters of water. The precipitated reaction mixture was stirred at room temperature for two hours, then placed in a chill room (4° C.) overnight. The product was collected and dried. Yield: 33.3 g. An analytically pure sample was obtained as follows: The crude material (44 g.) was dissolved in 250 ml. of dimethylformamide and treated with Darco G-60 (10 g.). The solution was filtered and diluted with 1 liter of water giving a gummy precipitate. The gum was collected and retreated with Darco G-6° in dimethylformamide. Slow addition of two volumes of water gave a crystalline product. Repeating this procedure on the isolated crystals gave a sample (23 g.) which analyzed correctly for the product with one mole of crystallization of dimethylformamide.

Example 5
4-DEDIMETHYLAMINO-4-OXO-6-DEMETHYLTETRACYCLINE-4-OXIME

In a solution of 17.5 g. of hydroxylamine hydrochloride in 400 ml. of water was suspended 10.0 g. of 4-hydroxytetracycloxide. To this suspension was added sufficient 10 N sodium hydroxide to raise the pH to ca. 10.7 and the resulting clear, dark solution was stirred for 10 minutes. The pH was then lowered to 8.5 with conc. hydrochloric acid whereupon the product began to crystallize. During crystallization the pH was maintained between 8.5–9.0. The product was collected by filtration whereby there was obtained 20.2 g. of the oxime in the form of its sodium salt. The sodium salt was converted to the free oxime by dissolving in 600 ml. of methanol containing 10 ml. of conc. hydrochloric acid. The solution was dried with Darco, filtered, and the clear, yellow filtrate was diluted with 1200 ml. of water. The free oxime thereupon crystallized from the solution, was collected by filtration, washed with water and dried. There was obtained 15 g. of the free oxime.

Example 6
7-CHLORO-4-DEDIMETHYLAMINO-4-OXO-6-DEMETHYLTETRACYCLINE-4-OXIME

By replacing the 4-hydroxytetracycloxide employed in Example 5 with an equimolecular quantity of 7-chloro-4-hydroxytetracycloxide and following substantially the same procedure described in Example 5, there is obtained the 7-chloro-4-dedimethylamino-4-oxo-6-demethyltetracycline-4-oxime.

Example 7
4-DEDIMETHYLAMINO-4-OXO-6-DEMETHYLTETRACYCLINE-4-HYDRAZONE

The procedure of Example 5 is repeated, substituting an equimolecular amount of hydrazine hydrochloride for the hydroxylamine hydrochloride employed in that example. There is thus obtained the 4-dedimethylamino-4-oxo-6-demethyltetracycline-4-hydrazone.

Example 8
7-CHLORO-4-DEDIMETHYLAMINO-4-OXO-6-DEMETHYLTETRACYCLINE-4-HYDRAZONE In place of the 4-hydroxytetracycloxide of Example 7 there is employed an equimolecular quantity of 7-chloro-4-hydroxytetracycloxide whereby the 7-chloro-4-dedimethylamino-4-oxo-6-demethyltetracycline - 4 - hydrazone is obtained in equally good yield.

Example 9
6-DEMETHYLTETRACYCLINE

To a solution of 4.0 ml. of formalin in 40 ml. of methanol is added 1.0 g. of 4-dedimethylamino-4-oxo-6-demethyltetracycline-4-oxime. The mixture was combined with the catalyst (400 mg. of 10% palladium on carbon) and then hydrogenated at about 50° C. and 50 lbs. pressure for 17 hours. The catalyst was then removed by filtration and the filtrate was concentrated to dryness under reduced pressure. Paper chromatography revealed that the crude product consisted of 6-demethyltetracycline and its 4-epimer. Further purification was accomplished by known methods.

6-demethyltetracycline may also be prepared by replacing the 4-dedimethylamino-4-oxo-6-demethyltetracycline-4-oxime with an equimolecular quantity of 4-dedimethylamino-4-oxo-6-demethyltetracycline - 4 - hydrazone and following substantially the same procedure.

Example 10
4-DEDIMETHYLAMINO-4-DIETHYLAMINO-6-DEMETHYLTETRACYCLINE

By replacing the formalin employed in Example 9 by an equimolecular quantity of acetaldehyde and following substantially the same procedure described in Example 9, there was obtained the 4-dedimethylamino-4-diethylamino-6-demethyltetracycline.

4-dedimethylamino - 4 - diethylamino-6-demethyltetracycline may also be prepared by replacing the 4-dedimethylamino-4-oxo-6-demethyltetracycline-4-oxime with an equimolecular quantity of 4-dedimethylamino-4-oxo-6-demethyltetracycline-4-hydrazone.

Example 11
4-DEDIMETHYLAMINO-4-OXO-6-DEMETHYLTETRACYCLINE-4-METHYLNITRONE

To a suspension of 4-dedimethylamino-4-oxo-6-demethyltetracycline-4-oxime (833 mg.) in water was added dimethylsulfate (0.19 ml.). The pH was then raised to 10.0 with 1 N NaOH. Complete solution resulted and the pH of this solution was maintained between 9–10 by the addition of more base for a one-hour period. After another hour, the pH of the reaction solution was lowered to 2.0 by the addition of dilute hydrochloric acid. The solid which precipitated was collected and dried. Yield: 800 mg. That N-alkylation rather than O-alkylation had occurred was demonstrated by the reduction of the product to 4-dedimethylamino - 4 - methylamino-6-demethyltetracycline as described in Example 12.

Example 12
4-DEDIMETHYLAMINO-4-METHYLAMINO-6-DEMETHYLTETRACYCLINE

The crude product (500 mg.) from Example 11 was dissolved in methyl cellosolve (20 ml.). This solution was combined with 200 mg. of 10% palladium on carbon and the mixture was hydrogenated at 60° C. and 50 lbs./sq. in. pressure for six hours. The catalyst was removed by filtration and the filtrate was concentrated to dryness under reduced pressure. The residue was collected with the aid of ether and dried. Paper chromatographic comparison to an authentic sample showed the major component to be 4-dedimethylamino-4-methylamino-6-demethyltetracycline.

Example 13
4-DEDIMETHYLAMINO-4-METHYLETHYLAMINO-6-DEMETHYLTETRACYCLINE 4-dedimethylamino - 4 - methylamino-6-demethyltetracycline (1.0 g.) was suspended in methylcellosolve (20 ml.). Then, 2 N sulfuric acid was added to an apparent pH reading of 4.0. Complete solution resulted. Acetaldehyde (3 ml.) and 10% palladium on charcoal (300 mg.) were added to the solution and the mixture was hydrogenated at 50 lbs. pressure for 17 hours. The catalyst was removed by filtration and the filtrate concentrated to dryness under reduced pressure. The product was collected with the aid of ether. The product consisted primarily of the two possible 4-epimers of 4-dedimethylamino - 4 - methylethylamino - 6 - demethyltetracycline. Isolation of pure components could be accomplished by partition chromatography.

Example 14
7-CHLORO-4-DEDIMETHYLAMINO-4-OXO-6-DEMETHYLTETRACYCLINE-4-METHYLNITRONE By replacing the 4-dedimethylamino-4-oxo-6-demethyltetracycline-4-oxime employed in Example 11 with an equimolecular quantity of 7-chloro-4-dedimethylamino-4-oxo-6-demethyltetracycline-4-oxime and following substantially the same procedure described in Example 11, there is obtained the 7-chloro-4-dedimethylamino-4-oxo-6-demethyltetracycline-4-methylnitrone.

What is claimed is:
1. A compound selected from the group consisting of those of the formula:

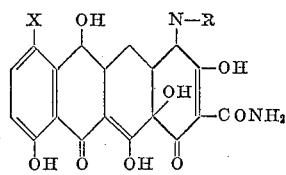

wherein X is selected from the group consisting of hydrogen and halogen, and R is selected from the group consisting of hydroxy and amino; the acid-addition salts of the 4-hydrazones; and the alkali metal salts of the 4-oximes.

2. 4 - dedimethylamino - 4 - oxo - 6 - demethyltetracycline-4-oxime.
3. 7 - chloro - 4 - dedimethylamino - 4 - oxo - 6 - demethyltetracycline-4-oxime.
4. 7 - bromo - 4 - dedimethylamino - 4 - oxo - 6 - demethyltetracycline-4-oxime.
5. 7 - iodo - 4 - dedimethylamino - 4 - oxo - 6 - demethyltetracycline-4-oxime.
6. 4 - dedimethylamino - 4 - oxo - 6 - demethyltetracycline-4-hydrazone.
7. 7 - chloro - 4 - dedimethylamino - 4 - oxo - 6 - demethyltetracycline-4-hydrazone.
8. 7 - bromo - 4 - dedimethylamino - 4 - oxo - 6 - demethyltetracycline-4-hydrazone.
9. 7 - iodo - 4 - dedimethylamino - 4 - oxo - 6 - demethyltetracycline-4-hydrazone.

10. A compound of the formula:

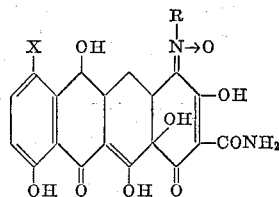

wherein R is lower alkyl and X is selected from the group consisting of hydrogen and halogen.

11. 4 - dedimethylamino - 4 - oxo - 6 - demethyltetracycline-4-methylnitrone.
12. 7 - chloro - 4 - dedimethylamino - 4 - oxo - 6 - demethyltetracycline-4-methylnitrone.
13. 7 - bromo - 4 - dedimethylamino - 4 - oxo - 6 - demethyltetracycline-4-ethylnitrone.
14. 7 - iodo - 4 - dedimethylamino - 4 - oxo - 6 - demethyltetracycline-4-n-propylnitrone.

References Cited by the Examiner

Fieser et al.: Organic Chemistry, 3rd ed., pp. 211–212 (1956).
Nerdel et al.: Ber. deut. Chem., vol. 86, pp. 1005–1010 (1953).

IRVING MARCUS, *Primary Examiner*.
JOHN D. RANDOLPH, *Examiner*.